(12) United States Patent
Scott et al.

(10) Patent No.: US 8,932,659 B2
(45) Date of Patent: Jan. 13, 2015

(54) ISOLATION AND PURIFICATION OF COMPONENTS OF WHEY

(75) Inventors: Stephen Niall Scott, Gloucestershire (GB); Ashok Krishnapillai, Gloucestershire (GB)

(73) Assignee: Separation Technologies Investments Limited (GB)

( * ) Notice: Subject to any disclaimer, the term of this patent is extended or adjusted under 35 U.S.C. 154(b) by 364 days.

(21) Appl. No.: 13/257,199

(22) PCT Filed: Mar. 17, 2010

(86) PCT No.: PCT/GB2010/000479
§ 371 (c)(1),
(2), (4) Date: Jan. 27, 2012

(87) PCT Pub. No.: WO2010/106320
PCT Pub. Date: Sep. 23, 2010

(65) Prior Publication Data
US 2012/0121788 A1    May 17, 2012

(30) Foreign Application Priority Data

Mar. 17, 2009  (GB) .................................. 0904562.6

(51) Int. Cl.
*A23L 1/29* (2006.01)
*A23C 9/142* (2006.01)
(Continued)

(52) U.S. Cl.
CPC ............. *A23C 9/1425* (2013.01); *A23C 9/1465* (2013.01); *A23J 1/205* (2013.01)
USPC ............. 426/583; 426/74; 426/239; 426/271; 426/491; 426/580

(58) Field of Classification Search
CPC ...... A23C 9/1425; A23C 9/142; A23C 21/00; A23C 2210/206

USPC .......................... 426/271, 239, 491, 580, 583
See application file for complete search history.

(56) References Cited

U.S. PATENT DOCUMENTS 5,118,516 A * 6/1992 Shimatani et al. ............. 426/271
6,284,124 B1 * 9/2001 DiMascio et al. ............. 205/753
(Continued)

FOREIGN PATENT DOCUMENTS

| CN | 1162927 | 10/1997 |
|---|---|---|
| CN | 1817149 | 8/2006 |

(Continued)

OTHER PUBLICATIONS

Int'l Search Report & Written Opinion issued in app. No. PCT/GB2010/000479 (2010).

(Continued)

*Primary Examiner* — Helen F Heggestad
(74) *Attorney, Agent, or Firm* — Barnes & Thornburg LLP

(57) ABSTRACT

A process for the isolation and/or purification of a desired component, particularly 3'sialyl lactose, from whey, particularly cheese whey, comprising the steps of: optionally subjecting the whey to ultrafiltration to provide a protein concentrate and a whey permeate; contacting the whey or whey permeate with at least one series of ion exchange resins, said series comprising a first weak acid cation resin, a first weak base anion resin, a second strong acid cation resin, a second weak base anion resin to demineralize the whey permeate; contacting this demineralized permeate with two final ion exchange resins comprising a strong acid cation resin and a final weak base anion resin, wherein the desired component, such as 3' sialyl lactose, is taken up on the final anion resin; and eluting the desired component from the final anion resin.

22 Claims, 1 Drawing Sheet

(51) Int. Cl.
*A23C 9/146* (2006.01)
*A23J 1/20* (2006.01)

(56) References Cited

U.S. PATENT DOCUMENTS

| | | | |
|---|---|---|---|
| 6,323,008 B1 * | 11/2001 | Pelletier et al. | 435/84 |
| 6,623,954 B1 | 9/2003 | Spade et al. | |
| 2009/0048440 A1 * | 2/2009 | Felo et al. | 536/55.3 |
| 2010/0055289 A1 * | 3/2010 | Kallioinen et al. | 426/587 |
| 2011/0209228 A1 * | 8/2011 | Cocks et al. | 800/4 |

FOREIGN PATENT DOCUMENTS

| | | |
|---|---|---|
| FR | 2142812 | 2/1973 |
| JP | 7132049 | 5/1995 |
| WO | WO 03/102205 | 12/2003 |
| WO | WO 2007/051475 | 5/2007 |

OTHER PUBLICATIONS

English Summary of Office Action issued in Application No. CN 201080021669.9 (2013).

\* cited by examiner

ISOLATION AND PURIFICATION OF COMPONENTS OF WHEY

CROSS REFERENCE TO RELATED APPLICATIONS

This application is a U.S. nationalization under 35 U.S.C. §371 of International Application No. PCT/GB2010/000,479, filed Mar. 17, 2010, which claims priority to United Kingdom application no. GB0904562.6, filed Mar. 17, 2009. The disclosures set forth in the referenced applications are incorporated herein by reference in their entireties.

The present invention relates to a process for the isolation and purification of components of whey, particularly but not exclusively isolated from whey permeate, especially the isolation of sialyl lactose, specifically 3'sialyl lactose (otherwise referred to as 3'-SL or 3-SL or 3 prime).

Cheese production generally involves the coagulation of milk protein (casein) to trap milk solids and milk fat into a curd matrix either by the action of enzymes on the milk or by reducing the pH of the milk using an appropriate acid. This curd matrix is then consolidated to express a liquid fraction, known as cheese whey. Cheese whey contains milk solids that are not held in the curd matrix, particularly milk saccharides and soluble proteins. Whey comprises 80-90% of the total volume of milk used in the cheese making process and contains more than half the solids from the original whole milk, including 20% of the protein and most of the lactose and has a very high organic content.

The disposal of whey has always been a problem for the dairy industry due to its high organic content. It is now possible to recover soluble proteins from the whey and value from the lactose and it is clearly desirable to recover as much of the organic content as possible to reduce the organic load of the effluent stream and to obtain a higher return from the whey. A major effort is underway by cheese processing companies to develop uses for this commodity.

It has become common in the trade to subject the whey to ultrafiltration (UF) to provide a protein concentrate and whey permeate. The protein concentrate has found applications in animal feed, fertilizer, fermentation and as a food filler. However, the lactose rich permeate often remains a waste product due to the inability to satisfactorily isolate and purify the individual components of the permeate that would make them suitable for further use.

The lactose rich permeate includes various oligosaccharides, such as 3'-sialyl lactose. This has been found to have valuable application in, for example, pharmaceuticals and baby food applications, but it is necessary to provide the component in a sufficiently pure form.

U.S. Pat. No. 6,323,008 (Pelletier) provides methods for producing sialyloligosaccharides from dairy sources and cheese processing waste streams by use of the catalytic activity of $\alpha$(2-3) trans-sialidases to exploit the high concentrations of the lactose and sialosides that naturally occur in cheese processing waste to drive the enzymatic synthesis of $\alpha$(2-3) sialyl-lactose. The sialyl lactose produced by this enzymatic action is purified by passing the mixture through a cation resin followed by a strong anion resin. The sialyl lactose is taken up on the anion resin and eluted using an appropriate solution. This process does purify the sialyl lactose but suffers from the drawback that the cation resin will only remove some of the cations with the remaining positive species forming a salt with the sialyl lactose. This then requires a strong anion resin to split the salt and allow binding of the sialyl lactose to the resin. However, the amount of sialyl lactose that actually binds to the column will depend upon the quantity of other anions present in the waste relative to the sialyl lactose and this will therefore require a clean-up of the eluted material which will be rich in other anions.

It is an aim of the present invention to provide a process for the isolation and purification of components of whey, especially 3'-sialyl lactose, particularly but not exclusively from whey permeate, that overcomes or at least alleviates the abovementioned drawbacks.

Accordingly, a first aspect of the present invention provides a process for the isolation and/or purification of a desired component of whey, such as 3'-sialyl lactose, from whey comprising the steps of:

contacting the whey with at least one series of ion exchange resins, said series comprising a first cation resin, a first anion resin, a second cation resin and a second anion resin to demineralise the whey;

contacting this demineralised whey with two further or final ion exchange resins comprising a strong acid cation and a final weak base anion resin wherein the desired component is taken up on the anion resin; and eluting the desired component from the final anion resin using an appropriate eluant.

In a preferred embodiment of the present invention, raw whey is subjected to ultrafiltration prior to contacting the ion exchange resins, the ultrafiltration step providing a protein concentrate and a whey permeate wherein the whey permeate contacts the ion exchange resins. However, raw whey or demineralised whey may be used for the process.

The desired component is preferably 3'-sialyl lactose. Other components may include 6'-sialyl lactose and/or other anionic oligosaccharides present in the permeate.

Preferably, the first cation resin is a weak acid cation resin. It is preferable for the second cation resin to be a strong acid cation resin. If the second cation resin is a weak acid cation, the pH of the material entering the resin should be maintained above pH 5, preferably above pH 5.5.

Preferably, the first and second base anions comprise weak base anions.

A second aspect of the present invention is directed to a desired component, in particular 3'-sialyl lactose, isolated and purified from whey according to the process of the first aspect of the present invention.

The ultrafiltered (UF) whey permeate may be directly passed through the ion exchange resins or it may be subjected to a full or more preferably, a partial pre-demineralisation step using a technique such as dialysis, electrodialysis, nanofiltration or any combination of the above to optimize cost effectiveness and/or technical efficiency.

In one embodiment of the present invention, the UF whey permeate is concentrated using nanofiltration before contacting the concentrated material with the series of resins as defined in the first aspect of the present invention. In this embodiment, it is preferable to contact the concentrated material with two series of resins, i.e. a first series of weak acid cation, base anion, strong acid cation, base anion, followed by a second series of weak acid cation, base anion, strong acid cation, base anion. The base anion may be strong or weak but is preferably weak to minimise loss and optimise elution.

The permeate may be subjected to a partial demineralization by electrodialysis. This is then passed through a series of cation and anion resins to allow a complete clean-up and subsequent binding of the 3-SL onto a final anion resin.

In one embodiment of the present invention, the relative 3'-SL content in the concentrated UF whey permeate may be increased by means of ion permeation chromatography (or ion exclusion chromatography) prior to contact with the series of resins according to the first aspect of the present invention. Preferably, the ion permeation chromatography is carried out at an elevated temperature, preferably being at least 50° C., preferably 50° C. to 80° C. The eluting material comprises a first fraction containing charged molecules including 3'-sialyl lactose followed by a second fraction containing uncharged molecules, such as lactose. The first fraction containing the 3'-sialyl lactose is then contacted with the series of resins with the 3'-sialyl lactose taken up on an anion resin.

The chromatographic separation resin is preferably CR1310K as supplied by Rohm & Haas. However other suitable resins exist. Examples include, but are not limited to, CR1310Ca & Na or CR1320 Ca, K or Na, DOWEX Monosphere 99Ca/320 by Dow or Diaion UBK530 by Mitsubishi or PCR145K by Purolite.

The 3'-sialyl lactose is eluted from the anion resin using either an appropriately diluted solution of alkali, salt, buffer solutions or acid. Alkali used include ammonium hydroxide, NaOH, KOH; salt solution include NaCl, KCl, ammonium chloride, ammonium acetate, ammonium formate, ammonium carbonate, etc.; and acids include dilute HCl, acetic acid, formic acid and/or buffers containing sufficient counter anions to effectively elute the 3'-sialyl lactose from the anion resin or appropriate mixtures of the above. However, an ammonium salt is preferred, as they tend to be volatile.

The 3'-sialyl lactose eluted off using an appropriate base or salt from the anion resin may be subjected to the removal of salts using a desalting resin such as Sephadex G25. For example, the eluting product may be concentrated to ~20-30% solids using nanofiltration and the resulting material is chromatographed on Sephadex G25 (or other such desalting resins available in the market). The first material to elute is 3'-sialyl lactose along with some of the larger molecules followed by the smaller molecules such as the NPNs and salts. If one were to use a solution containing large ions such as acetate, formate, etc., the removal of these molecules by Sephadex G25 or its equivalent resin is somewhat poor. Nevertheless purity can be improved by adjusting resin bed depth and flow rates. In such an instance one may elect to remove the impurities using an appropriate anion resin (strong base or weak base anion resin) followed by a weak acid cation resin to adjust the pH to neutral. The salt may also be removed by diafiltration, nanofiltration, electrodialysis, dialysis or other procedures.

The cleaned up eluted material may be further concentrated by nanofiltration and/or evaporation and is preferably dried to form a white product.

Any suitable strong and weak cation and anion resins may be used in the process of the present invention. The first weak acid cation is preferably a polyacrylic weak acid cation, preferably that supplied under the trade name IMAC HP336. Alternative polyacrylic weak cations include PWC11 supplied by Rohm and Haas, DOWEX MAC-3 as supplied by Dow or Diaion WK10 and WK40 as supplied by Mitsubishi. The first weak anion is preferably an acrylic weak base anion, preferably that supplied under the trade name FPA55. Alternative acrylic weak base anions include Diaion WA10, WA20, WA21J and WA30 as supplied by Mitsubishi or A847 or PFA847 as supplied by Purolite. Styrenic weak base anion resins may also be used. Strong base anion resins may also be used but this could result in the increased use of regenerants for the subsequent cleaning of the resins.

The second strong acid cation is preferably a Styrene-DVB strong acid cation, more preferably that sold under the trade name HP1110. Alternative strong acid cations include FPC23 supplied by Rohm and Haas, DOWEX 88, DOWEX 88 MB, DOWEX Monosphere 88 as supplied by Dow, Diaion SK1B, SK104, SK110, SK112, SK116, PK208, PK212, PK216, PK220, PK228 or HPK25 as supplied by Mitsubishi or PFC100 or PFC150 as supplied by Purolite.

The second weak base anion is preferably a Styrene-DVB weak base anion, more preferably being that sold under the trade name FPA51. Alternative weak base anions include DOWEX 66, DOWEX Monosphere 66 or DOWEX Monosphere 77 as supplied by Dow or Diaion WA10, WA20, WA21J and WA30 as supplied by Mitsubishi.

The weak base anion resins may be replaced with strong anion resins, albeit weak base anion resins are preferred. Such resins include, but are not limited to, FPA42, FPA90 from Rohm & Haas; A600, A400E, A420 and A850 from Purolite and Dowex A, Dowex 1, Dowex 22, Dowex SAR from Dow Chemical Co.

In a further aspect, the present invention also provides a process for preparing a dairy product enriched with a desired component of whey, which process comprises the preparation of a desired component of whey according to the process of a first aspect of the present invention. The desired component of whey can optionally be 3'sialyl lactose, and the process can optionally be for preparing a dairy product enriched with 3'sialyl lactose. Optionally, the dairy product is a milk product, but any dairy product to be enriched with a desired component of whey could be used. The dairy product enriched with a desired component of whey can be prepared by contacting the eluted desired component with a dairy product stream. The eluted desired component and the dairy stream can each independently be a liquid or a solid. Optionally, the eluted desired component and the dairy stream are each independently a liquid. Optionally, the process for preparing a dairy product comprises the further step of concentrating the dairy product. The concentrating step can involve any one, or combination of nanofiltration, evaporation, and drying the dairy product.

The invention will now be more particularly described, by way of example only, to the accompanying examples in which Example 1 describes the direct isolation of 3'-sialyl lactose from UF whey permeate using the process of the present invention; Example 2 describes the isolation of 3'-sialyl lactose from concentrated UF whey permeate using the process of the present invention wherein the UF whey permeate is first concentrated using nanofiltration; and Examples 3 to 7 describe the isolation of sialyl lactose from concentrated UF whey permeate using the process of the present invention wherein the UF whey permeate is first concentrated using nanofiltration followed by ion permeation chromatography, and with reference to the accompanying drawings in which:

EXAMPLE 1

The primary step in the current invention for all examples is an ultrafiltration (UF) step whereby a major proportion of the protein in cheese whey is removed. The UF step may include the production of Whey Protein Concentrate (WPC) 35, 60, 80 and 85. A by-product of this process is the whey permeate at ~4 to 7% solids which is composed of approximately 90 to 95% lactose, 1 to 5% protein (NPNs and true protein), 4 to 7% ash and 0.05 to 0.25% 3'-sialyl lactose (3-SL). At certain times of the year, the proportion of 3-SL may be significantly higher, up to as much as 0.5% by weight of the solids.

Figure 1:
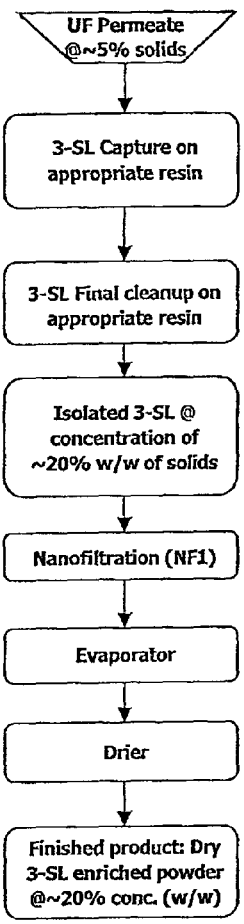
FIG. 1 is a flow diagram illustrating the steps involved in the process of Example 1.

In the present example, the UF permeate was directly contacted with a series of resins and the 3-SL was finally taken up on an anion resin. The steps are summarized in FIG. 1 of the accompanying drawings.

1,035 liters of UF whey permeate stream at ~5% solids and ~60 ppm of 3'-SL was directly contacted with the following resins in series by being pumped through them in 200 mm diameter columns:

15 liters of IMAC HP336 (a polyacrylic weak acid cation);
22 liters of FPA55 (an acrylic Weak base anion);
23 liters of HP1110 (Styrene-DVB Strong acid cation);
23 liters of FPA51 (Styrene-DVB Weak Base. Anion);
17 liters HP1110 (Styrene-DVB Strong acid cation);
17 liters of FPA51 (Styrene-DVB Weak Base Anion).

The 3-SL was taken up on the last anion resin, which was eluted with 28 liters of 4.4% ammonium hydroxide followed by 50 liters of demineralised water. The eluting material contained approximately 6 to 15% by weight of 3'-sialyl lactose. This was then contacted with 30 liters of IMAC HP336 (a polyacrylic weak acid cation) followed by 23 liters of FPA51 (Styrene-DVB Weak Base Anion) to remove the excess ammonia and to adjust the pH of final product to between 7 and 9.5.

The resulting product contained a very high pure form of 3'-sialyl lactose in the region of 12 to 50% by weight of solids. The ash content in the finished material was <10%, the rest being protein. Approximately 20 to 50% of the protein value was NPN. Thus, in this example the permeate is contacted directly by pumping the 3-SL at a fixed flow rate through the following resins in series: cation-anion-cation-anion-cation-anion. This enables the removal of unwanted and interfering molecules which then results in the 3-SL being taken up specifically on the last anion resin column. Specifically the following sequence gave the best results with a maximum recovery of 3-SL:

weak acid cation (WAC)-weak base anion (WBA)-strong acid cation (SAC)-weak base anion (WBA)-strong acid cation (SAC)-weak base anion (WBA).

The 3-SL is taken up on the last anion column along with a small amount of protein (true protein+NPNs) and some anions. The 3-SL is then eluted using ammonium hydroxide (the chloride salt of ammonia, potassium, sodium, magnesium or calcium or combinations thereof may also be successfully employed).

Should pressure drop across the beds be too great, one may use a break tank at an appropriate position to collect the treated permeate, which is then pumped through the rest of the columns.

The eluted 3-SL was then cleaned up on a cation resin followed by an anion resin to remove the salts. The salt may alternatively be removed by diafiltration, NF, electrodialysis, dialysis or other procedures. An added advantage of using resin technology is the removal of certain unwanted NPNs as well.

The resulting material has a 3-SL content of between 7 to 42% by weight of 3-SL, which can be concentrated by NF and/or evaporation and is finally dried to yield a white product with a very high concentration of 3-SL.

The uptake of 3'-SL from the permeate on the final weak base anion resin was close to 100% with elution being 85 to 100% of all the adsorbed 3'-SL. In the above process it is possible that one skilled in the art of ion exchange resin technology may consider altering the concentration or volume or both of ammonium hydroxide to optimise elution and thereby obtain the highest purity with or without compromising yield. One may also choose to elute some of the unwanted materials of the anion resin as a preliminary step by using a lower concentration of ammonium hydroxide and then eluting with an opimum concentration of ammonium hydroxide to get the highest purity and yield of 3-SL.

EXAMPLE 2

Figure 2:
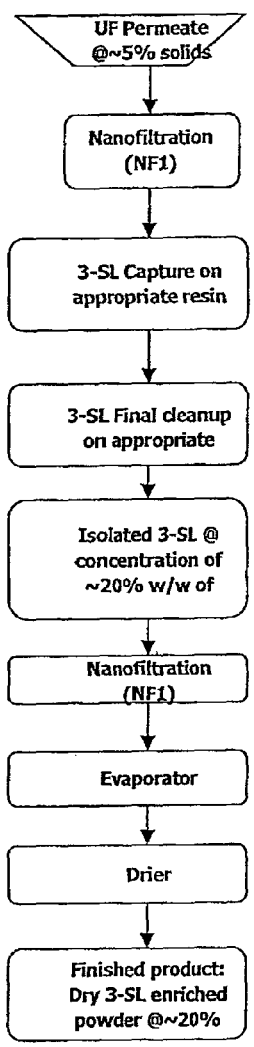
FIG. 2 is a flow diagram illustrating the steps involved in the process of Example 2.

The whey permeate was again subjected to an ultrafiltration (UF) step as in Example 1 above. The UF permeate was then concentrated to a solids content of 30% using nanofiltration (NF) and the concentrated material was contacted with a series of resins according to the present invention, wherein the 3-SL was finally taken up on an anion resin. The steps are summarized in the FIG. 2 of the accompanying drawings.

UF permeate was concentrated by nanofiltration to yield a NF retentate at ~15 to 25% solids and containing between 186 and 208 ppm of 3'-sialyl lactose. 2,500 ml of the above NF retentate was passed/pumped through the following resins in series by being pumped through them in 25-mm diameter columns:

120 ml of IMAC HP336 (a polyacrylic weak acid cation);
180 ml of FPA55 (an acrylic Weak base anion);
180 ml of HP1110 (Styrene-DVB Strong acid cation);
180 ml of FPA51 (Styrene-DVB Weak Base Anion);
100 ml of IMAC HP336 (a polyacrylic weak acid cation);
150 ml of FPA55 (an acrylic Weak base anion);
150 ml of HP1110 (Styrene-DVB Strong acid cation);
150 ml of FPA51 (Styrene-DVB Weak Base Anion).

Again, a break tank was successfully used after the fourth column to avoid pressure drop issues.

The 3-SL was taken up on the last anion resin, which was eluted with 180 ml of 4.4% ammonium hydroxide followed by 300 ml of demineralised water. The eluting material contained approximately 6 to 18% by weight of 3'-sialyl lactose. This was then contacted with 250 ml of IMAC HP336 (a polyacrylic weak acid cation) followed by 120 ml of FPA51 (Styrene-DVB Weak Base Anion) to remove the excess ammonia and to adjust the pH of final product to between 7 & 9.5. The resulting product contained a very high pure form of 3'-sialyl lactose in the region of 20 to 50% by weight of solids. The ash content in the finished material was <10%, the rest being protein. Approximately 20 to 50% of the protein value was NPN.

EXAMPLE 3

Figure 3:
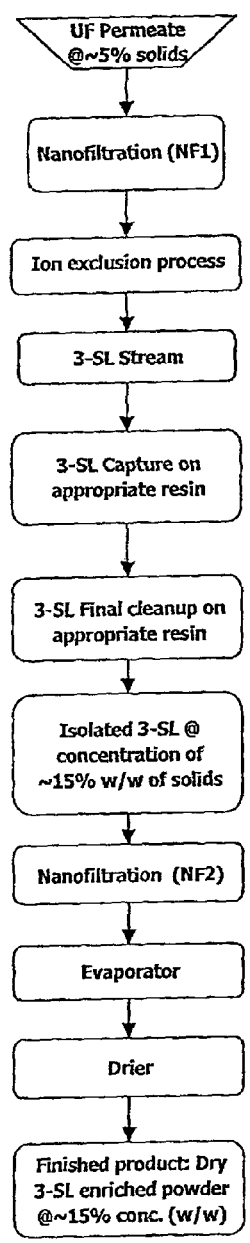
FIG. 3 is a flow diagram illustrating the steps involved in the process of Example 3.

The whey permeate was again subject to an ultrafiltration step as described in relation to Examples 1 and 2. The UF permeate was then concentrated to a solids content of 20 to 30% (preferably 25%) using nanofiltration and the permeate was then subjected to ion permeation chromatography (otherwise often referred to as ion exclusion chromatography) at an elevated temperature of between 50 and 80° C. The eluting material was divided into two fractions—an initial fraction containing the charged molecules that included a major proportion of the protein (including NPNs), minerals and 3-SL followed by a fraction containing the uncharged molecules such as lactose. The initial fraction containing the 3-SL was then contacted with a series of resins as shown in Example 1 and the 3-SL was finally taken up on an anion resin. The steps are summarized in FIG. 3 of the accompanying drawings.

In further detail, the ion permeation step involved using a chromatographic column containing 650 liters of CR1310K to give a bed height of 3 meters calibrated with process water. An operating temperature of between +4 and 75° C. was evaluated, with the best results having been obtained at the elevated temperatures. UF permeate was concentrated by nanofiltration to yield a NF retentate at ~22 to 25% solids and containing between 118 and 304 ppm (average 220 ppm) of 3'-sialyl lactose. This material was then subjected to an ion exclusion process by pumping the nanofiltered material through the ion exclusion resin bed followed by water. For optimum results, the resin to NF retentate loading ratio per cycle was maintained at 1:0.1 followed by 0.9 bv of water (where 1 bv=total resin volume, viz.=650 liters). A constant flow rate of between 0.3 to 0.86 bv/hour was evaluated. The variation in flow rate had no significant bearing on the nature of the chromatogram obtained. The eluting material was split into two fractions—an initial fraction containing 3'-sialyl lactose along with minerals & protein (including NPNs) followed by a second fraction containing an almost pure form of lactose. The net volume of 3'-sialyl lactose enriched fraction obtained per cycle was 135 liters. The solids content varied between 0.5 to 1% and the 3'-sialyl lactose level was 0.5 to 1.3% by weight of solids. Recovery of 3'-sialyl lactose was in the range of 80 to 100% with an average recovery of 85% in over 95 cycles of operation.

950 liters of the 3-SL enriched fraction was then passed through the following resins in series:
  15 liters of IMAC HP336 (a polyacrylic weak acid cation);
  22 liters of FPA55 (an acrylic Weak base anion);
  17 liters of HP1110 (Styrene-DVB Strong acid cation);
  17 liters of FPA51 (Styrene-DVB Weak Base Anion).

The 3-SL was taken up on the last anion resin, which was eluted with 28 liters of 4.4% ammonium followed by 50 liters of demineralised water. The eluting material contained approximately 6 to 15% by weight of 3'-sialyl lactose. This was then contacted with 30 liters of IMAC HP336 (a polyacrylic weak acid cation) followed by 23 liters of FPA51 (Styrene-DVB Weak Base Anion) to remove the excess ammonia and to adjust the pH of final product to between 7 & 9.5. The resulting product with a solids content of between 0.3 to 1% contained 3'-sialyl lactose in the region of 0.5 to 3% by weight of solids. The ash content in the finished material was <10%, the lactose content was 30 to 50%, the rest being protein. Approximately 20 to 50% of the protein value was NPN.

EXAMPLE 4

In an alternate process, 1,600 liters of a 3-SL enriched fraction produced by nanofiltration and an ion permeation step as described in Example 3 was contacted with the following resins in series by being pumped through them in 200-mm diameter columns:
  15 liters of IMAC HP336 (a polyacrylic weak acid cation);
  22 liters of FPA55 (an acrylic Weak base anion);
  17 liters of HP1110 (Styrene-DVB Strong acid cation);
  17 liters of FPA51 (Styrene-DVB Weak Base Anion);
  17 liters HP1110 (Styrene-DVB Strong acid cation);
  17 liters of FPA51 (Styrene-DVB Weak Base Anion).

The 3-SL was taken up on the last anion resin, which was eluted with 28 liters of 4.4% ammonium hydroxide followed by 50 liters of demineralised water. The eluting material contained approximately 6 to 15% by weight of 3'-sialyl lactose. This was then contacted with 30 liters of IMAC HP336 (a polyacrylic weak acid cation) followed by 23 liters of FPA51 (Styrene-DVB Weak Base Anion) to remove the excess ammonia and to adjust the pH of final product to between 7 & 9.5. The resulting product contained a very high concentration of purified 3'-sialyl lactose in the region of 20 to 70% by weight of solids. The ash content in the finished material was <10%, the rest being protein. Approximately 15 to 30% of the protein value was NPN.

EXAMPLE 5

The whey permeate was again subject to an ultrafiltration step as described in relation to Examples 1 and 2. The UF permeate was contacted with a series of resins in two phases according to the present invention, wherein the 3-SL was finally taken up on an anion resin. The steps are a variant of those summarized in the FIG. 1 of the accompanying drawings.

UF permeate at 2 to 6% solids and containing between 30 and 80 ppm of 3'-sialyl lactose was used.

In Phase I of the present example, a quantity of the above UF retentate was passed/pumped through the following resins in series by being pumped through them in 200-mm diameter columns:
  15 liters of IMAC HP336 (a polyacrylic weak acid cation);
  22 liters of FPA55 (an acrylic Weak base anion);
  17 liters of HP1110 (Styrene-DVB Strong acid cation);
  17 liters of FPA51 (Styrene-DVB Weak Base Anion);

The cut-off point for the UF retentate loading was determined as being the point when the effluent conductivity reached approximately 300 to 400 microSiemens. Three successive repetitions of the above procedure resulted in retentate loadings of 610 liters, 650 liters and 600 liters respectively. The product of interest (retentate) containing demineralised 3'-SL having been through the above four resin columns, was displaced with 100 liters of process water, yielding 684 liters, 724 liters and 674 liters of Phase I product in the three successive repetitions described above.

In Phase II of the present example 800 liters of the Phase I eluting material was then contacted with 17 liters of HP1110 (Styrene-DVB Strong acid cation) followed by 17 liters of FPA51 (Styrene-DVB Weak Base Anion). The product of interest containing purified 3'-SL was taken up on the last resin and was eluted from it with 20 liters of 1% potassium chloride followed by 45 liters of process water.

In two repetitions of Phase II, a total of 120 liters of eluted product was obtained. This was then subjected to nanofiltration followed by diafiltration to produce 7.3 liters of retentate. This product contained 27% by weight of solids of 3'-sialyl lactose.

After freeze drying, 2.96 liters of the nanofiltered and diafiltered product produced 420 g of dried product containing 30% by weight of solids of 3'-SL. The ash content in the finished material was 16%, the protein was 30% with 2% of the protein value being NPNs.

EXAMPLE 6

In another process, the 3-SL enriched fraction from the ion exclusion step described in Example 3 was concentrated to a solids content of ~12% by nanofiltration. 15 ml of this material was chromatographed on 150 ml of Sephadex G25 to yield a finished product that contained 3-SL at 4 to 6% by weight of solids. Recovery was ~98%. Any bulk desalting resin such as Toyopearl HW40 or Bio-Gel P-4 or Bio-Gel P-6 or any other such desalting resins including Sephadex G10 that are available in the market can be used.

As illustrated in the above Examples, the isolation process of the present invention in essence involves passing the permeate material (the untreated UF permeate in the case of Example 1, nanofiltered permeate in the case of Example 2 or ion excluded material in the case of Examples 3 to 6) through the following resins:

Weak Acid Cation resin (eg. Imac HP 336 or WK 40)
Weak or Strong Anion resin (eg. FPA55, or FPA42)
Strong Acid Cation resin (eg. Imac HP 1110 or FPC23)
Weak or strong anion resin (eg. FPA51, FPA55, or FPA42)

This allows for the clean-up of the permeate material. Following the clean-up, the 3-SL can be absorbed on an appropriate anion exchange resin (in a preferred embodiment this was FPA51, as this allowed for the best elution). The material may be passed through a cation resin prior to the anion resin to allow for all the 3'-SL to be taken up on the anion resin. Using a strong base anion with or without a cation in front would also result in the 3'-SL being taken up on the resin, but would require a higher strength of elution media. Elution from the resin was achieved using ammonium hydroxide, calcium chloride, NaCl and KCl or a combination thereof.

EXAMPLE 7

In another series of experiments carried out along the same lines as in Example 5, the eluting fraction of 3'-sialyl lactose was split into various fractions and a fraction of 100% pure 3'-sialyl lactose was obtained with a reduced yield of 19-20%.

The fraction can be directly freeze dried or spray dried following the concentration of the solids by an appropriate method.

The principle surrounding the process of the present invention consists of removing unwanted and/or interfering negatively charged molecules to a level that is sufficient to allow the 3-SL to be preferentially attached to the anion resin (FPA51). The cation resins are essential to allow the 3-SL to become negatively charged, before it can be picked up by the anion resin.

It may have been expected that the 3-SL would be picked up on any anion resin following the removal of positively charged molecules using any strong cation resin. But surprisingly this does not appear to be the case, suggesting that the bond between 3'-SL and the resin to be very weak, which is easily disrupted by the presence of any competing anionic species. It is essential to have all four resins in the series mentioned above. In the instance when nanofiltered permeate is used as the starting material (see Example 2), it is highly desirable to have the four resins mentioned above plus these four resins again in order for the 3-SL to be picked up on the last column containing a weak anion resin.

3-SL in its pure and native form exists as a very weak negatively charged molecule. The anion resin can only pick up the 3-SL if almost all the cationic species excluding $H^+$ ions have been removed and much of the competing anions are removed. The process of the present invention aims to obtain a purified form of 3-SL varying in concentration of anywhere between 3 to 60% by weight of solids. This is not straight forward to achieve. The first weak acid cation removes much of the divalent cations such as Ca and Mg and to a lesser extent Na and K which are present in the whey as well as certain amino acids and proteins. The second resin, a weak base anion, picks up some of the negatively charged molecules such as chlorides, phosphates and sulphates and to some extent citrates, lactates and negatively charged amino acids and protein. The third resin is a strong cation resin which then picks up almost all of the remaining cations. The fourth resin is a weak base anion which picks up any remaining anions preferentially over the 3-SL. In order to ensure that minimal 3-SL is picked up by this column, it is preferable to over process so that any of the 3-SL taken up by the fourth resin is selectively knocked out by the competing anions. Once the material is cleaned up (or >90% demineralised), it may be sent through a strong acid cation to mop up virtually all the remaining cations thereby allowing the 3-SL to exist in its native or free state (most likely to be "H-3-SL"). The weak anion in its —OH form will then readily react with "H-3-SL" (H reacts with OH to form water) and the now negatively charged 3-SL is readily picked up by the weak anion resin.

It is clear from the above, that prior to contacting the material containing 3'-SL with the resins, one may opt to reduce the ionic load on the resins by procedures/techniques selected from the group such as dialysis, electrodialysis, diafiltration, etc. This would enhance the loading capacity of the resins, but does not alter the underlying principle of isolating the oligosaccharide of interest.

In all cases the last resin is a weak base anion although technically a strong base anion would work equally well in picking up the 3-SL. However, elution from a strong base anion is more difficult in comparison to the weak base anion. A chloride salt such as KCl, NaCl or $CaCl_2$ or a combination thereof are preferred. Other volatile salts would include ammonium hydroxide, ammonium acetate, ammonium formate, formic acid, acetic acid, etc.

Following elution from the anion column, the material is contacted with a weak acid cation to remove ammonia and/or Ca if $CaCl_2$ or K if KCl is used followed by a weak anion such as FPA51 to adjust pH back to the neutral point and if KCl or $CaCl_2$ is used then to remove excess Chlorides. Alternately, the material may be nanofiltered and/or diafiltered to achieve the desired target specifications in the product.

One skilled in the art may also employ the technique of taking sections of the eluting fractions containing the 3'-sialyl lactose to thereby obtain 100% purity of the desired product, albeit with a compromised yield.

Although the examples illustrating the process has been restricted to 3'-SL, there are various components of interest such as proteins, amino acids and other oligosaccharides in the permeate, which can be successfully isolated using the same operating principle described in this specification. Furthermore, by varying the concentration of the eluting solutions anyone skilled in the art of resin technology can increase purity by selectively fractionating the adsorbed material from the resin.

The invention claimed is:

1. A process for at least one of the isolation or purification of 3'-sialyl lactose, 6'-sialyl lactose, anionic oligosaccharides from whey, the process comprising the steps of:
    contacting the whey with at least one group of ion exchange resins, the group comprising a first weak acid cation resin, a first weak base anion resin, a second strong acid cation resin and a second weak base anion resin to produce a demineralized whey;
    contacting the demineralised whey with two further ion exchange resins comprising a third strong acid cation resin followed by a weak base anion resin wherein the 3'-sialyl lactose, 6'-sialyl lactose, anionic oligosaccharides and/or proteins is taken up on the weak base anion resin; and
    eluting the 3'-sialyl lactose, 6'-sialyl lactose, anionic oligosaccharides and/or proteins from the weak base anion resin.

2. A process according to claim 1 further comprising subjecting the whey to an ultrafiltration step prior to contact with the ion exchange resins to provide a protein concentrate and a whey permeate wherein the whey permeate contacts the ion exchange resins.

3. A process as claimed in claim 1, wherein the whey or whey permeate is subjected to a concentration step prior to its passage through the resins.

4. A process as claimed in claim 1, wherein the whey or whey permeate is subjected to additional procedures to improve isolation and purification of the 3'-sialyl lactose, 6'-sialyl lactose, anionic oligosaccharides, the additional procedures being selected from dialysis, electrodialysis, diafiltration, nanofiltration and ion exchange resins.

5. A process according to claim 4 further comprising concentrating the whey or whey permeate using nanofiltration before contacting the concentrated material with the at least one group of resins.

6. A process according to claim 1 further comprising increasing the relative concentration of 3'-sialyl lactose, 6'-sialyl lactose, anionic oligosaccharides in the unconcentrated or concentrated whey or whey permeate by means of ion permeation chromatography or ion exclusion chromatography to provide an enriched first fraction containing charged molecules including 3'-sialyl lactose, 6'-sialyl lactose, anionic oligosaccharides followed by a second fraction, wherein the first fraction is then contacted with the at least one group of resins.

7. A process according to claim 6, where the enriched first fraction is contacted with at least one group of resins to obtain a demineralized enriched fraction.

8. A process according to claim 6, wherein the enriched fraction is contacted with at least one group of resins to adsorb 3'-sialyl lactose, 6'-sialyl lactose, anionic oligosaccharides onto a further anion resin.

9. A process according to claim 6, further comprising carrying out the ion permeation chromatography at an elevated temperature of at least 50 C.

10. A process according to claim 9 wherein the elevated temperature is 50 C to 80 C.

11. A process according to claim 1 further comprising eluting 3'-sialyl lactose, 6'-sialyl lactose, anionic oligosaccharides from the further anion resin using either an appropriately diluted solution of alkali, salt, buffer solutions or acid.

12. A process according to claim 11 wherein an ammonium salt is used for the elution.

13. A process according to claim 11 wherein a chloride salt of an alkaline earth metal or any divalent cation is used for the elution.

14. A process according claim 1, further comprising clean up of the eluted material by contact with an appropriate cation resin followed by a weak base anion resin.

15. A process according to claim 1 further comprising clean up of the eluted material by procedures selected from the group consisting of diafiltration, nanofiltration, electrodialysis and dialysis.

16. A process according to claim 1, further comprising concentrating the eluted material by nanofiltration and/or evaporation and/or drying the product.

17. A process according to claim 1 wherein the second strong cation resin is a Styrene-DVB strong acid cation.

18. A process according to claim 1 wherein the second weak base anion resin is a Styrene-DVB or acrylic weak base anion.

19. A process according to claim 1, wherein the third cation resin is a Styrene-DVB strong acid cation.

20. A process for preparing a dairy product, which process comprises the preparation of 3'-sialyl lactose, 6'-sialyl lactose, anionic oligosaccharides of whey according to claim 1.

21. A process according to claim 20, further comprising the step of contacting 3'-sialyl lactose, 6'-sialyl lactose, anionic oligosaccharides from the eluting step with a dairy product stream.

22. A process according to claim 20, wherein the dairy product is a milk product.

* * * * *